Nov. 5, 1946.  R. T. BURROWS  2,410,566
LAWN MOWER SHARPENER
Filed June 21, 1945
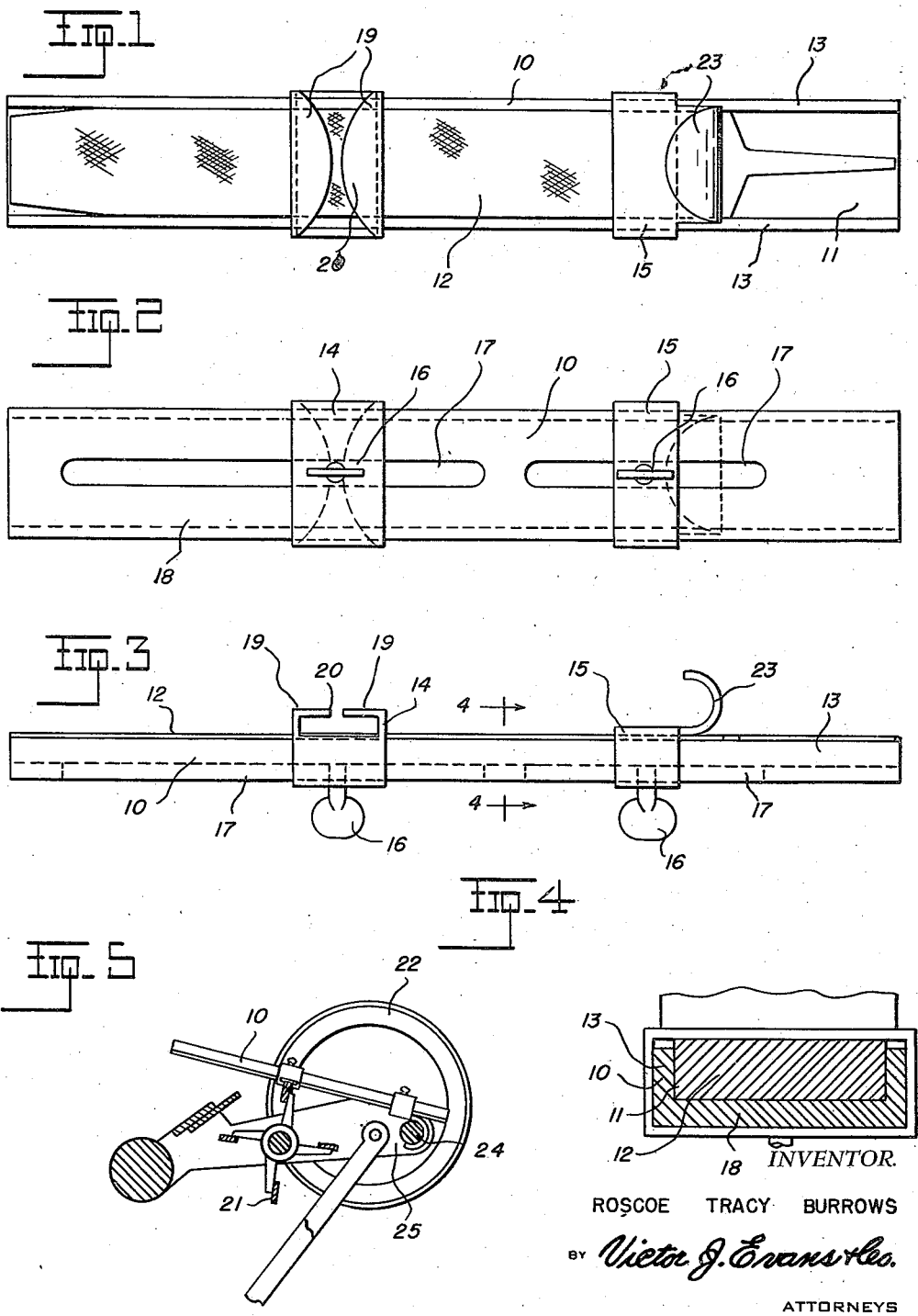
INVENTOR.
ROSCOE TRACY BURROWS
BY Victor J. Evans & Co.
ATTORNEYS Patented Nov. 5, 1946

2,410,566

UNITED STATES PATENT OFFICE 2,410,566

LAWN MOWER SHARPENER

Roscoe T. Burrows, Mystic, Conn.

Application June 21, 1945, Serial No. 600,666

1 Claim. (Cl. 76—82.1)

The invention relates to a sharpener, and more especially to a lawn mower blade sharpening tool.

The primary object of the invention is the provision of a tool of this character, wherein a steel file or the like can be placed therein for its application to the cutting edges of the blades of a lawn mower cutter reel, so that such edges can be sharpened with dispatch and without excessive labor on the part of the user of the tool, the latter being hand manipulated in its applied position, and the blades of the reel will be sharpened uniformly and true.

Another object of the invention is the provision of a tool of this character, wherein the steel file can be removably placed therein and reversed or adjusted for presenting an unused surface to the blades, when the file becomes dull in previously used spots thereof, the tool being of novel construction and unique in its arrangement.

A further object of the invention is the provision of a tool of this character, which is simple in construction, thoroughly reliable and efficient in operation, strong, durable, readily and easily applied and removed to and from working position with dispatch, possessed of few parts, requiring little exertion on the part of a user thereof in the working of the same, and inexpensive to manufacture.

With these and other objects in view, the invention consists in the features of construction, combination and arrangement of parts as will be hereinafter more fully described, illustrated in the accompanying drawing, which shows the preferred embodiment of the invention, and pointed out in the claim hereunto appended.

In the accompanying drawing:

Figure 1 is a plan view of the tool constructed in accordance with the invention;

Figure 2 is a similar view looking toward the other side of the tool;

Figure 3 is a side edge view of the tool;

Figure 4 is a sectional view taken on the line 4—4 of Figure 3 looking in the direction of the arrows;

Figure 5 is a fragmentary vertical sectional view through a lawn mover showing the tool applied thereto for the sharpening of the blades of its cutting reel.

Similar reference characters indicate corresponding parts throughout the several views in the drawing.

Referring to the drawing in detail, the tool constructed in accordance with the invention, comprises an elongated channeled body piece 10, preferably made from metal, having its channel 11 opening through one side face thereof, and this channel is of uniform width throughout its extent, being open at opposite ends of such piece 10 for the insertion of a steel file 12 therein for counter-seating within the said piece. The channel 11 provides side edge flanges 13 upon the piece 10, so that there will be no material play to the file 12 when seated therein.

About the piece 10 are the adjustable bale loops 14 and 15, respectively, each having a set screw 16, which plays through its companion elongated slot 17 in the solid facing 18 to the said piece 10 and arranged longitudinally thereof at the medium thereof. Each screw 16 acts against the file 12 for clamping it fixed with the piece 10.

The loop 14 is provided with opposed tracking ears 19 which have confronting rounded contacting edges 20, so that there will be no binding when a cutter reel blade 21 of a lawn mower, only a portion thereof being indicated at 22, is placed between the ears 19, in that the reel is caused to rotate when the piece is moved laterally across the cutting edge of such blade and the file 12 through action on this edge sharpens the same. The mower 22 is disposed in an inverted position as best seen in Figure 5 of the drawing when the tool is applied and manipulated by hand for the sharpening of the blade of the reel.

The loop 15 is formed with a hanger hook 23 which is engaged over a cross rod 24 of the frame 25 of the mower as best seen in Figure 5 of the drawing, so as to hold the tool in a fixed applied position on such mower and for the guiding of the tool when the same is shifted back and forth following the spiral formation of the blade being sharpened by the file 12 contacting with its cutting edge. The end of the piece 10 remote from the loop 14 can be depressed for better filing action on the blade worked upon by the file 12. The tool is hand operated and caused to reciprocate when in the position shown in Figure 5 of the drawing for the sharpening of the blade worked upon by such tool. The loops 14 and 15 can be adjusted relative to each other according to the disposition of the blades of the reel with respect to the cross rod 24 of the frame 25 of the mower 22 for the correct setting of the tool.

What is claimed is:

A tool of the kind described, comprising a flat, elongated body piece, flanges formed at the opposite longitudinal marginal edges of said body in vertical relation therewith, a filing element seated on said body within said flanges, loop-like bales embracing the body piece, and the filing element, opposed tracking ears on one of said bales having the confronting edges thereof rounded, a hook on the other bale, longitudinal slots in said body piece intermediate said flanges, and means engageable in said slots and connected to said bales for holding the bales in adjusted relation to each other on the body piece.

ROSCOE T. BURROWS.